United States Patent

[11] 3,603,214

[72] Inventor Donald K. Murrell
 La Mirada, Calif.
[21] Appl. No. 858,952
[22] Filed Sept. 18, 1969
[45] Patented Sept. 7, 1971
[73] Assignee Robertshaw Controls Company
 Richmond, Va.

[54] PRESSURE REGULATOR CONVERTER
 13 Claims, 5 Drawing Figs.
[52] U.S. Cl. .................................................. 92/133,
 137/505.41, 267/177
[51] Int. Cl. ............................................... F01b 31/00
[50] Field of Search.......................................... 92/133;
 137/505.41, 331–333, 625.11, 625.15;
 251/625.17, 636.4, 321, 227, 263, 262; 267/177

[56] References Cited
UNITED STATES PATENTS
1,872,632 8/1932 Brindley ...................... 251/227 X
3,412,650 11/1968 Stang, Jr. ....................... 92/133

Primary Examiner—Martin P. Schwadron
Assistant Examiner—Allen M. Ostrager
Attorneys—Auzville Jackson, Jr., Robert L. Marben and Anthony A. O'Brien ABSTRACT: A pressure regulator changeover device having a two-position adjustment and including a selector biased by the regulator-biasing means and movable between separately adjustable spaced abutments having cam surfaces to preclude any intermediate selector positioning so that the biasing means may only be set to either of two predetermined regulator pressure settings.

INVENTOR,
Donald K. Murrell

BY Anthony A. O'Brien
ATTORNEY

INVENTOR,
Donald K. Murrell

BY Anthony A. O'Brien
ATTORNEY

PRESSURE REGULATOR CONVERTER

BACKGROUND OF THE INVENTION

1. Field of the Invention

This invention relates generally to pressure regulators for delivering a fluid flow at a predetermined pressure, and in particular, to such a regulator provided with adjustment means to select one of two predetermined pressures to accommodate the type of fluid being utilized.

2. Description of the Prior Art

The prior art, as exemplified by U.S. Pat. No. 3,338,264, is representative of pressure-regulating devices designed to regulate the pressure of two different types of fuel, e.g. the pressure of natural or manufactured gas and the pressure of liquid petroleum gas for various types of burner apparatus. However, the known prior art regulators do not have any mechanism to assure that the pressure regulator settings are properly set; as a result it is possible for such regulators to be inadvertently adjusted to an intermediate position and thus cause malfunction of the burner apparatus.

SUMMARY OF THE INVENTION

The present invention is summarized in that a pressure converter for a pressure regulator having a flexible diaphragm includes a biasing spring exerting a regulatory biasing force on the diaphragm, and an operator element engaging the biasing spring and movable between first and second positions to set the biasing force on the diaphragm to correspond to respective first and second predetermined regulator pressure settings, spaced adjustable abutments cooperating with the operator element to define its first and second positions, and a cam surface cooperating with the operator element to assure complete movement thereof between its first and second positions by the biasing spring whereby the biasing spring is precluded from any position other than its first and second predetermined regulator settings.

It is one object of the present invention to assure the setting of a pressure regulator to one of two positions.

The present invention has an additional object in that a pressure regulator is selectively adjustable to one of two predetermined positions by a simple, inexpensive mechanism.

Other objects and advantages of the present invention will become more fully apparent from the following detailed description of a preferred embodiment of the invention when considered in conjunction with the accompanying drawings.

DESCRIPTION OF THE PREFERRED EMBODIMENT

Figure 1:
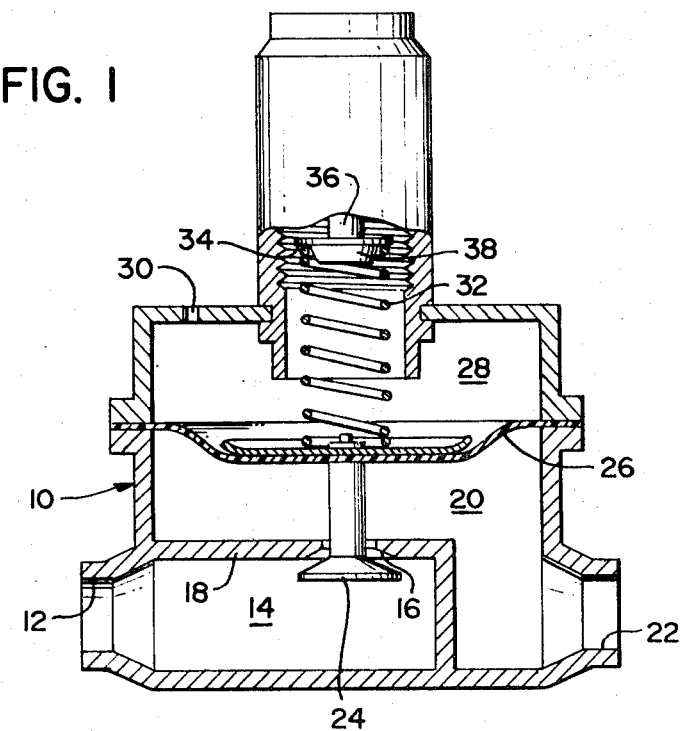
FIG. 1 is a schematic representation of a pressure-regulating device employing a pressure converter embodying the present invention.

As is illustrated schematically in FIG. 1, the present invention is embodied in a pressure regulator, indicated generally at 10, having an inlet 12 leading to an inlet chamber 14; a valve seat 16 centrally located in a partition 18 separates the inlet chamber 14 from an outlet pressure chamber 20 which communicates with an outlet 22 in the casing 10.

A valve element 24 cooperates with the upstream side of valve seat 16 and has a stem protruding therethrough with its upper end affixed to the central portion of a flexible diaphragm 26 which is sealed and mounted at its periphery to adjacent sections of the casing 10. The diaphragm 26 defines a movable wall between the outlet pressure chamber 20 and an upper chamber 28 which is vented at orifice 30 for communication with the atmosphere or with a fluid having a pressure different from atmospheric pressure. A coil spring 32 is disposed in the upper chamber 28 and is mounted in compression between a backup plate fixed to the central portion of diaphragm 26 and head 34 of a cylindrical selector or operator member 36. A frustoconical protrusion is formed upon the lower surface of the head 34 of selector 36 to maintain alignment of the upper end of coil spring 32.

Figure 2:
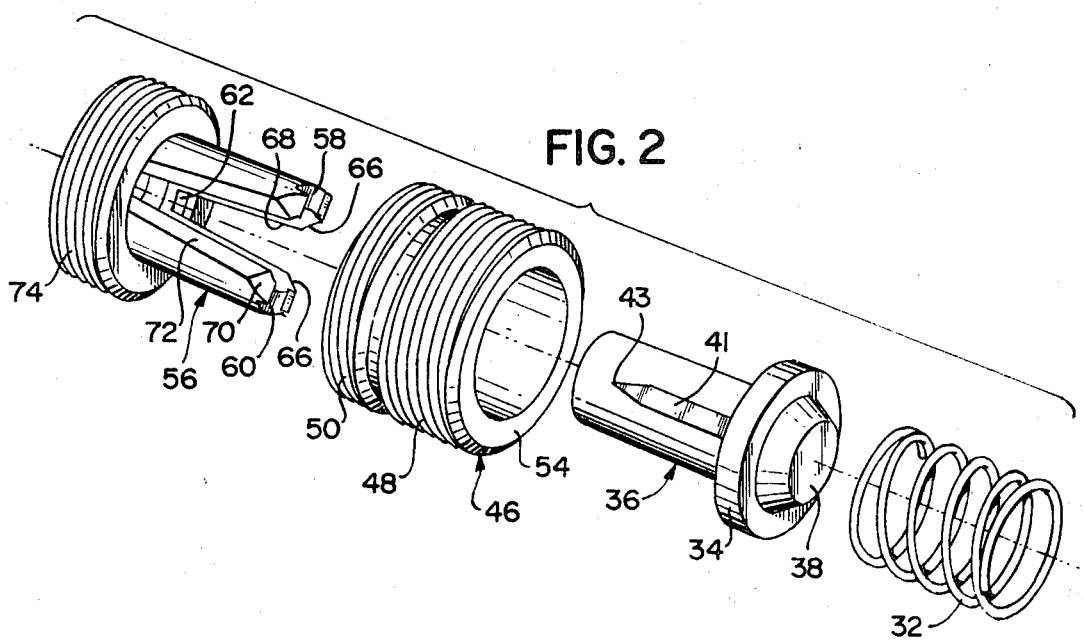
FIG. 2 is an exploded perspective view of the adjustment mechanism of the pressure converter shown in FIG. 1.
Figure 5:
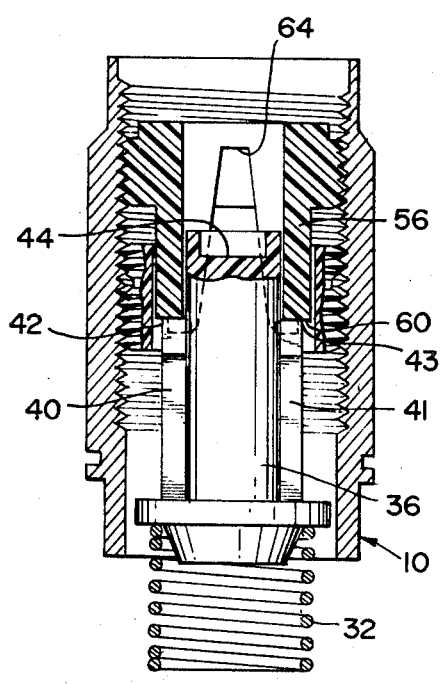
FIG. 5 is a cross section similar to FIGS. 3 and 4 illustrating the position of the adjustment mechanism in a different predetermined pressure setting.

Referring to FIGS. 2 and 5, a pair of diametrically opposed rectangular shoulders 40 and 41 are longitudinally aligned on the upper cylindrical shaft of selector 36; the sidewalls of each shoulder converge at their upper ends to form diametrically opposed peaks 42 and 43. The outer end of selector 36 is provided with a tool-receiving void 44 having outwardly divergent sidewalls 45.

Figure 3:
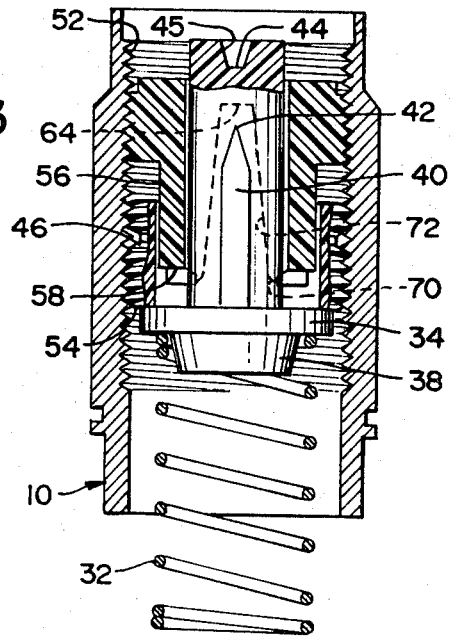
FIG. 3 is a cross section of the pressure converter of FIG. 1 showing the adjustment mechanism in a predetermined pressure setting.

Selector 36 is slidably and rotatably disposed within the cylindrical bore of a hollow nut 46 having lower external main threads 48 and upper external locking threads 50 for axial adjustment within an internal threaded bore 52 located in an upper section of the casing 10. As seen in FIG. 3, the lower edge of nut 46 provides a continuous annular abutment against which the upper surface of head 34 of selector 36 is biased by coil spring 32 when the converter is in a first position.

An annular sleeve 56, having a lower portion partially interposed between the hollow bore of nut 46 and the shaft of selector 36, contains a pair of diametrically opposed slots 58 and 60 and a pair of diametrically opposed ledges 62 and 64 displaced 90° from the slots 58 and 60. A pair of low angle cam surfaces 66—66 extend from slots 58–60 to a pair of high-angle cam surfaces 68—68 which in turn extend to ledge 62; similarly, a pair of low-angle cam surfaces 70—70 extend from slots 58–60 to a pair of high-angle cam surfaces 72—72 which in turn extend to ledge 64. The diametrically opposed peaks 42 and 43 of selector 36 cooperate with slots 58–60 and cam surfaces 66—66, 68—68, 70—70 and 72—72 to assure axial movement of the selector 36 upon rotation thereof. Annular sleeve 56 includes a collar 74 at its upper end which may be threadably mounted in bore 52, as shown, or press fit if desired.

The pressure regulator of the present invention may be adjusted to either of two predetermined pressure settings in which the fluid flow entering the inlet 12 is accordingly regulated so that the pressure of the flow leaving outlet 22 is substantially constant.

FIG. 3 represents the various positions of the adjustment mechanism when the regulator is set to a first position defining a natural gas setting. This particular setting is usually accomplished at the factory, prior to the mounting of annular sleeve 56 within the casing 10, by rotating the cylindrical nut 46 with a suitable tool so that coil spring 32 exerts the desired biasing force on diaphragm 26; thereafter, sleeve 56 is either press fit or otherwise suitably mounted within threaded bore 52. However, ledges 62–64 are not in engagement with peaks 42 and 43 of shoulders 40 and 41 because the lower edge 54 of nut 46 defines the upper limit of movement of the selector 36 under the biasing force of coil spring 32. In this position, the diaphragm 26 functions in the well-known manner to regulate the flow through outlet 22 to a constant pressure in accordance with the capacity requirements of a gas burner utilizing natural gas.

Figure 4:
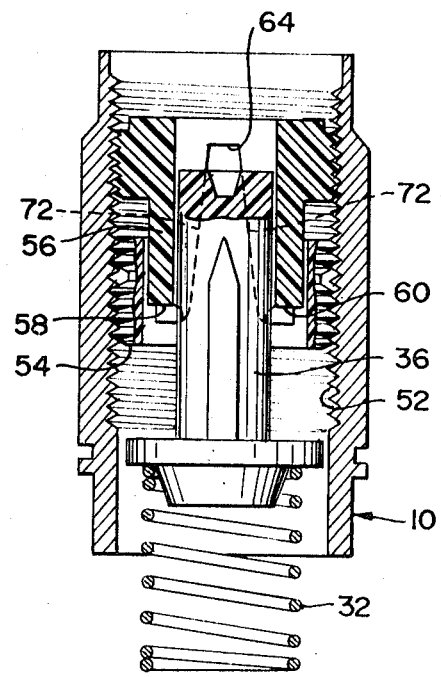
FIG. 4 is a cross section similar to FIG. 3 but showing the adjustment mechanism in a intermediate position.

To convert the regulator to liquid petroleum gas pressures, the selector 36 is displaced axially toward the interior of the casing 10 by a suitable tool, such as a screwdriver, inserted into void 44 in the upper surface of the selector. FIG. 4 illustrates an intermediate location of the selector during the conversion; in this position, rotation of selector 36 causes shoulders 40 and 41 to engage the camming surfaces of annular sleeve 56. Since displacement of annular sleeve 56 by the selector 36 would produce undesired repositioning of slots 58 and 60, void 44 is constructed with outwardly divergent sidewalls which tend to force the screwdriver out of the void when rotational resistance from annular sleeve 56 is encountered, thus precluding inadvertent dislocation of the sleeve as the regulator setting is changed.

When the shoulders 40 and 41 of selector 36 have been depressed below the slots 58–60 of annular sleeve 56, the selector is rotated through a 90° angle and the tool removed; peaks 42 and 43 will then abut slots 58–60 of the annular sleeve to hold the selector 36 in its fully extended position (see FIG. 5). As a result, the spring force applied by coil spring 32 will be altered correspondingly whereby the diaphragm 26 and valve 24 are positioned to regulate variations in pressure of liquid petroleum gas. The particular adjustment for the liquid petroleum setting is accomplished by rotating the collar 74 of annular sleeve 56 in the threaded bore 52 of the casing 10; slots 58–60 cooperate with peaks 42 and 43 of shoulders 40 and 41 to prevent the selector from sliding down along the cam surfaces of sleeve 56 to its natural gas position during rotation of the sleeve. Such adjustment may be made either at the factory prior to installation of the regulator or in the field, due to the accessibility of annular sleeve 56.

In order to convert back to a natural gas setting, the selector 36 is depressed slightly to permit peaks 42 and 43 to clear the upper edges of slots 58–60, and is then rotated 90°. As the selector is subsequently released, the peaks of shoulders 40 and 41 ride down opposed cam surfaces 66 and 68, and 70 and 72 until the upper surface of head 34 of the selector abuts the lower annular edge 54 of nut 46. The coil spring 32 is thus returned to its initial natural gas setting as shown in FIG. 3.

Camming surfaces 66, 68, 70 and 72 cooperate with peaks 42 and 43 on selector 36 to assure complete movement of the selector from its liquid petroleum gas position to its natural gas position thereby permitting effective conversion of a pressure regulator by an unskilled person without specific instructions. Selector 36 can only assume two positions because the cam surfaces of annular sleeve 56 will cause the shoulders 40 and 41 of the selector to move down from the liquid petroleum setting whenever peaks 42 and 43 are not in engagement with slots 58–60. Such an arrangement precludes any intermediate positioning of the regulator and thus eliminates a great hazard from gas burner apparatus that has been specifically designed for a particular type of gas. In addition, once the natural and liquid petroleum gas settings have been adjusted, there is no need for calibration every time a conversion is made since coil spring 32 can only assume one or the other of the two predetermined positions.

In as much as the present invention is subject to many modifications, variations and changes in detail, it is intended that all matter contained in the foregoing description or shown on the accompanying drawings shall be interpreted as illustrative and not in a limiting sense.

What is claimed is:

1. In a pressure regulator having a flexible regulating diaphragm, a pressure converter comprising
   biasing means exerting a regulatory biasing force on said diaphragm,
   operator means engaging said biasing means and movable between first and second displaced positions to set the biasing force on said diaphragm to correspond to a respective one of first and second predetermined regulator pressure settings,
   spaced abutment means cooperating with said operator means to define its first and second positions, and
   cam means defined by angularly inclined surfaces of said abutment means cooperating with said operator means to assure complete movement thereof between its first and second positions by said biasing means whereby said biasing means is precluded from any setting other than its first and second predetermined regulator settings.

2. The invention as recited in claim 1 wherein said spaced abutment means comprises a plurality of abutments horizontally spaced from each other.

3. The invention as recited in claim 1 wherein said spaced abutment means comprises a plurality of abutments horizontally and vertically spaced from each other.

4. The invention as recited in claim 3 wherein said plurality of abutments include a pair of diametrically opposed abutments and a continuous annular abutment.

5. The invention as recited in claim 1 wherein said spaced abutment means comprises first and second independently adjustable annular sleeves adapted to define said first and second positions, respectively, of said operator means, and wherein said first sleeve includes a single continuous annular abutment and said second sleeve includes a pair of diametrically opposed abutments.

6. The invention as recited in claim 5 wherein said operator means includes a shaft having a pair of diametrically opposed shoulders to cooperate with said pair of diametrically opposed abutments and said cam means.

7. The invention as recited in claim 6 wherein said shaft of said operator means is terminated at one end by an annular collar to cooperate with said single continuous annular abutment.

8. The invention as recited in claim 6 wherein each of said pair of diametrically opposed abutments comprises a slot adapted to engage a respective one of said pair of shoulders to retain said operator means in its second position whereby inadvertent displacement of said operator means to its first position is precluded.

9. The invention as recited in claim 7 wherein said second annular sleeve includes a pair of diametrically opposed ledges radially and axially displaced from said pair of diametrically opposed abutments.

10. The invention as recited in claim 9 wherein said cam means comprises at least a single sloping surface defined by said second annular sleeve and extending between each of said pair of abutments and each of said pair of ledges.

11. The invention as recited in claim 10 wherein each of said pair of shoulders of said operator means is tapered to form a peak member cooperating with said cam means upon rotation of said operator means to assure complete movement of said operator means to its first position.

12. The invention as recited in claim 11 wherein said first annular sleeve cooperates with said annular collar of said operator means when said operator means is in its first position to maintain said peak members spaced from said ledges of said second annular sleeve.

13. The invention as recited in claim 12 wherein said shaft of said operator means is terminated at its other end by a head element defining a tool-receiving depression having externally diverging walls whereby said shaft is precluded from rotation until rotational and axial forces are simultaneously applied thereto.